(12) United States Patent
Petersen (10) Patent No.: US 12,038,067 B2
(45) Date of Patent: Jul. 16, 2024

(54) ROPE COUPLING APPARATUS

(71) Applicant: Sheridon L. Petersen, Elizabeth, IN (US)

(72) Inventor: Sheridon L. Petersen, Elizabeth, IN (US)

(*) Notice: Subject to any disclaimer, the term of this patent is extended or adjusted under 35 U.S.C. 154(b) by 258 days.

(21) Appl. No.: 17/505,298

(22) Filed: Oct. 19, 2021

(65) Prior Publication Data

US 2023/0118599 A1 Apr. 20, 2023

(51) Int. Cl.
*F16G 11/14* (2006.01)
*F16G 11/04* (2006.01)

(52) U.S. Cl.
CPC ............ *F16G 11/14* (2013.01); *F16G 11/046* (2013.01)

(58) Field of Classification Search
CPC ................................ F16G 11/14; F16G 11/046
See application file for complete search history.

(56) References Cited

U.S. PATENT DOCUMENTS

| | | | | |
|---|---|---|---|---|
| 278,097 A * | 5/1883 | Collins | ............... | F16G 11/14 |
| | | | | D8/383 |
| 434,888 A | 8/1890 | Ross | | |
| 518,880 A | 4/1894 | Evans | | |
| 1,390,152 A * | 9/1921 | Miltner | ............... | D06F 53/00 |
| | | | | 24/129 R |
| 1,806,162 A * | 5/1931 | Hahn | ............... | A43C 7/04 |
| | | | | 24/712.9 |
| 3,090,343 A | 5/1963 | Ronsheim | | |
| 3,309,745 A * | 3/1967 | Gintz | ............... | H02G 7/056 |
| | | | | 174/79 |
| 3,711,901 A | 1/1973 | Close | | |
| D289,373 S * | 4/1987 | Kimball | ............... | D8/382 |
| 4,745,663 A | 5/1988 | Crowson | | |
| 4,939,820 A * | 7/1990 | Babcock | ............... | F16G 11/046 |
| | | | | 24/129 B |
| 4,941,434 A * | 7/1990 | Ellwanger | ............... | B60R 22/10 |
| | | | | 24/129 B |
| 5,297,499 A | 3/1994 | Grange | | |
| 5,625,925 A | 5/1997 | Richards | | |
| 5,774,945 A | 7/1998 | Ginocchio | | |
| 5,784,763 A | 7/1998 | Cassidy | | |
| 6,317,935 B1 | 11/2001 | O'Rouke | | |
| 6,330,949 B1 * | 12/2001 | DeRisio | ............... | A47F 5/0006 |
| | | | | 24/130 |
| 6,595,562 B1 * | 7/2003 | Wood | ............... | B65D 33/004 |
| | | | | 292/307 A |
| 6,966,520 B2 | 11/2005 | Sherman | | |

(Continued)

FOREIGN PATENT DOCUMENTS

| | | |
|---|---|---|
| GB | 785504 A | 10/1957 |
| GB | 2217768 A | 11/1989 |

OTHER PUBLICATIONS

FishBone, Knotless Rope Tie, retrieved from internet on Aug. 12, 2021; URL: https://www.fishbonefish.com/products/fish-bone?variant=17381673140322.

(Continued)

*Primary Examiner* — David M Upchurch
(74) *Attorney, Agent, or Firm* — Dinsmore & Shohl LLP (57) ABSTRACT

A rope coupling apparatus configured for connecting or terminating a rope without the use of rope knots or terminations is disclosed. The rope coupling apparatus may include a retainer member with a first portion, a second portion and opposing side portions, an opening through the first portion of the retainer member, a rope receiver on the second portion of the retainer member; and a plurality of notches disposed on one or both of the opposing side portions of the retainer member.

24 Claims, 9 Drawing Sheets

(56) References Cited

U.S. PATENT DOCUMENTS

| | | | |
|---|---|---|---|
| 6,968,600 | B2 | 11/2005 | Marcaccio |
| D642,448 | S * | 8/2011 | Lee .............................. D8/356 |
| 8,096,024 | B2 | 1/2012 | Smith |
| 9,636,526 | B2 * | 5/2017 | Galyan .................... A62B 1/14 |
| 10,099,071 | B2 | 10/2018 | Pettey |
| 10,197,132 | B2 * | 2/2019 | Pfahnl .................. F16G 11/106 |
| 2012/0137475 | A1 * | 6/2012 | Seader ..................... A43C 7/00 |
| | | | 24/129 R |
| 2014/0196256 | A1 * | 7/2014 | Garcia ................... F16G 11/14 |
| | | | 24/129 R |

OTHER PUBLICATIONS

Amazon, Notch Backbone Knotless Rigging Connector, retrieved from internet on Aug. 12, 2021; URL: https://www.amazon.com/Notch-35174-Backbone-Rigging-Connector/dp/B00XNPF6XK.

Rock Exotica RP5 "The Bolt" Rigging Plate, retrieved from internet on Aug. 12, 2021: URL: https://www.shforestrysupplies.com/423-rp5-rock-exotica-rp5-the-bolt-rigging-plate.html.

FallTech, Rope Termination Plate, retrieved from Internet Jul. 23, 2021; URL: https://falltech.com/news/rope-termination-plate.

Buckingham Manufacturing, Buck Port-A-Wraps, retrieved from Internet Jul. 23, 2021; URL: https://buckinghammfg.com/port-a-wraps/.

Frontline, Rope Termination Plate, retrieved from Internet Jul. 23, 2021; URL: https://frontlinefall.com/rope-connection-termination-plate/.

European Patent Office; International Search Report and Written Opinion issued in PCT/US2022/078353, dated Jan. 30, 2023, 10 pages.

The International Bureau of WIPO; International Preliminary Report on Patentability for app. No. PCT/US2022/078353 issued on Apr. 23, 2024 and mailed on May 2, 2024.

* cited by examiner

FIG. 10

# ROPE COUPLING APPARATUS

BACKGROUND

When it is desired to connect a rope, pulling line, cable, or cord to another rope or coupling fitting/accessory (e.g., a hitch, carabiner, swivel, or shackle, etc.), rope knots such as, for example, square knots or sheet bend knots have traditionally been used. However, such rope knots tend to tighten and become seized when substantial forces are applied to the rope. Regardless of whether the rope knots seize, the rope knots are known to weaken a rope, thus, detrimentally impacting the rope's ultimate strength. Also, it may be difficult and time-consuming to tie the rope knots before use and untie the rope knots after use.

Accordingly, a need continues to exist in the art for a manner and/or apparatus for quick rope coupling with increased coupling strength compared with the rope knots. Additionally, it would be desirable to have a device that can be inserted anywhere along the length of a rope to connect for pulling, and not require connection at the ends of the rope.

SUMMARY

The herein-described embodiments address these and other problems associated with the art by providing a rope coupling apparatus configured for pulling or connecting a rope without the use of rope knots or terminations. The disclosed apparatus may be configured to function as an interface between a rope and an item to be pulled, or a fall protection system, work positioning/restraining system, rope access system, or rescue system for the purpose of coupling the rope to another rope/fitting/accessory/item. The disclosed apparatus provides a temporary and secure rope end termination alternative solution for ropes without prespliced connecting eyes or knots, which can severely weaken coupling strength. For example, in some embodiments, the rope coupling apparatus may include an elongated planar member with a plurality of spaced, rope-receiving notches along its length, and a rope receiver may be provided on an end portion of the elongated member to direct the rope to thread therethrough. In addition, a further opening may be provided in the other end portion of the elongated member for releasably attaching common rope coupling accessories, such as a carabiner or the like. When the rope is threaded through the rope receiver and the plurality of notches and is pulled, the friction the rope develops with the disclosed apparatus secures the rope in place for various pulling purposes, such as pulling, towing, restraining, anchoring, climbing, rope braking, safety or rescue harness, and so on.

A related object of the disclosure is to provide such a rope coupling apparatus that provides secure rope coupling interconnection methods, yet which permits the rope to be easily connected/disconnected when it is desired by the user. Yet another object is to provide such a rope coupling apparatus that is relatively inexpensive and practicable for manufacture and well-suited for conventional fabrication processes. Other objects and advantages of the disclosed apparatus will become apparent from the specification and appended claims and from the accompanying drawing illustrative of the invention.

In some embodiments, a rope coupling apparatus may comprise a retainer member, an opening through the retainer member, a rope receiver on the retainer member, and a plurality of notches on the retainer member. The retainer member may have a first, distal portion, a second, proximal portion, and opposing side portions between the first portion and the second portion. The opening may be through the first portion of the retainer member, the rope receiver may be on the second portion of the retainer member, and the plurality of notches may be disposed on one or both of the opposing side portions.

In some other embodiments, a rope coupling apparatus may comprise a retainer member with a retainer member fastener opening, an opening through said retainer member, a plurality of notches disposed on edges of said retainer member; and a rope receiver coupled on the retainer member. The rope receiver may comprise a guide with a guide fastener opening coupled to the retainer member and a fastener. The guide may be disposed on the retainer member by inserting the fastener through the guide fastener opening and the retainer member fastener opening.

In some further embodiments, a method of terminating a rope may comprise (a) providing a rope coupling apparatus having a retainer member, an opening through the retainer member at a first end, a rope receiver at an end opposite the opening, and a plurality of notches, (b) inserting the rope through the rope receiver, (c) threading the rope around the retainer member of the rope coupling apparatus by sequentially threading the rope into the plurality of notches, and (d) tightening the rope around the retainer member of the rope coupling apparatus.

These and other advantages and features, which characterize the invention, are set forth in the claims annexed hereto. For a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

The embodiments discussed hereinafter are directed in part to a rope coupling apparatus or rope termination plate, and a method therefor that utilizes the disclosed rope coupling apparatus for rope connections and terminations. The functionality of the disclosed apparatus is a significant improvement over known designs. The apparatus described herein not only provides an easy solution to couple a rope to another rope or coupling fitting/accessory, but also enables a potentially easy manner of increasing the coupling strength. The embodiments shown and described include a rope coupling apparatus having a rope receiver that provides additional security of a retained rope. As will be shown and described below, the rope receiver, is preferably, but not necessarily, equipped with one or more guides on one surface of the retainer member of the rope coupling apparatus for guiding the rope. Applications in which such rope coupling apparatus are of importance may include, but not be limited to, the connection of lines or ropes for securing or pulling items. Additionally, such rope coupling apparatus may be employed in various other applications. In general, the disclosed apparatus is convenient to use and provides secure connections and also an easy release. Throughout the rest of this specification, "rope" will be used broadly to include all types of rope, cord, cable (excluding steel or hard metals), and the like.

Figure 1:
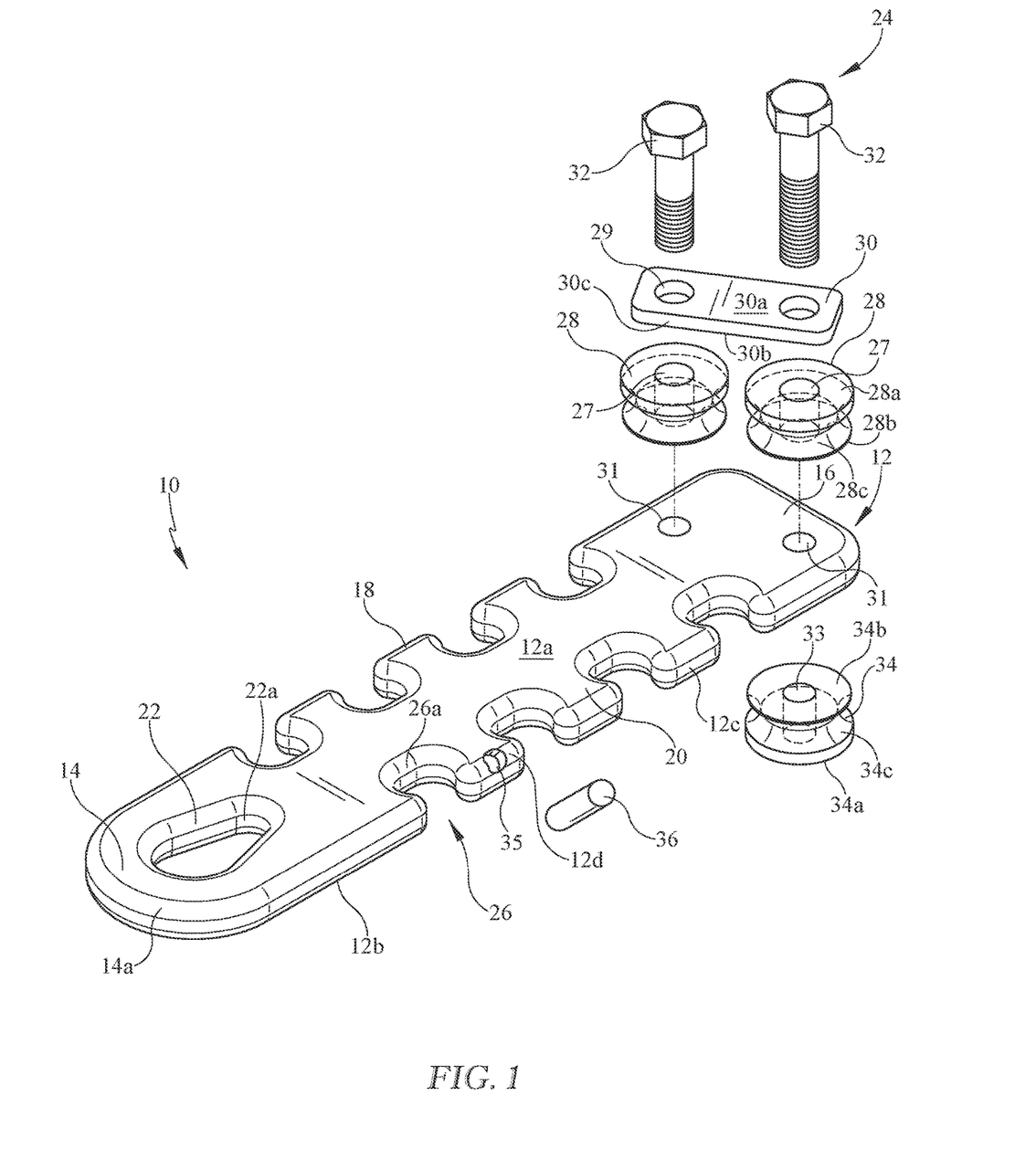
FIG. 1 is a perspective exploded view of a rope coupling apparatus, according to one embodiment.

Turning now to the drawings, wherein like numbers denote like parts throughout the several views, FIG. 1 illustrates a generalized perspective exploded view of one embodiment of the present invention. In the embodiment shown, the apparatus 10 may include a retainer member 12 having a first, distal portion 14, a second, proximal portion 16, and opposing side portions 18 and 20 between the first portion 12 and the second portion 14. The retainer member 12 may function as a spool on which slack in a rope may be wound around. An opening 22 may be provided at the first portion 14 of the retainer member 12 to receive a rope or a common rope coupling accessory or fitting, such as a carabiner or the like, to secure the apparatus 10 to an anchor or similar structure. In addition, a rope receiver 24 may be provided at the second portion 16 of the retainer member 12, instead of simply another opening 22, to provide additional security of a retained rope by preventing the rope from unwinding from the apparatus 10. More details regarding the rope receiver 24 will be discussed below.

In some embodiments, the retainer member 12 may also include a plurality of rope receiving notches 26 spaced along one or both opposing sides 18 and 20, between the first end 14 and the second end 16. The plurality of notches 26 may be of similar sizes and have smooth edges 26a either rounded or beveled, to facilitate the threading of a rope and minimize the risk of cutting or tearing of the rope as it is passed through each notch 26 or is seated therein. The rounded or beveled edge 26a may also help to relieve the stress/pressure from the rope to the body of the retainer member 12. In some embodiments as shown here, each of the plurality of notches 26 may be semicircular and disposed on both opposing sides 18 and 20 along the longitudinal axis of the retainer member 12. In order to allow the rope to pass through the plurality of notches 26 relatively unencumbered, each notch 26 may have a size slightly larger than the diameter of the rope. For example, each notch 26 may have a radius up to, for example, approximately 1.5 times the diameter of the rope. The ideal size depends on the size of the rope used and the tensile load expected. In some embodiments as shown here, the number of the plurality of notches 26 may be at least 4 on one or both opposing sides 18 and 20 for at least 3 turns of the rope to prevent the rope from slipping during use. It should be understood that the number of the plurality of notches 26 is not limiting here as there may be any number of notches 26 on one or both opposing sides 18 and 20 of the retainer member 12.

Figure 2A:
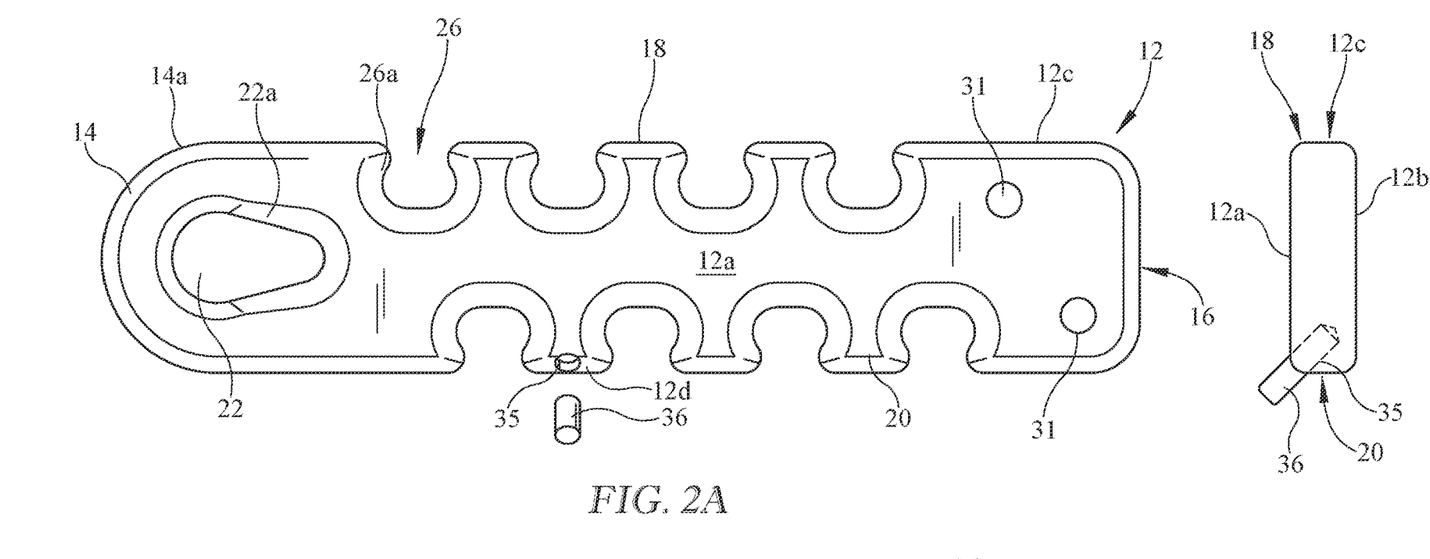
FIG. 2A is a combination of a plan view and a side view of a retainer member of the rope coupling apparatus of FIG. 1, according to one embodiment.
Figure 2B:
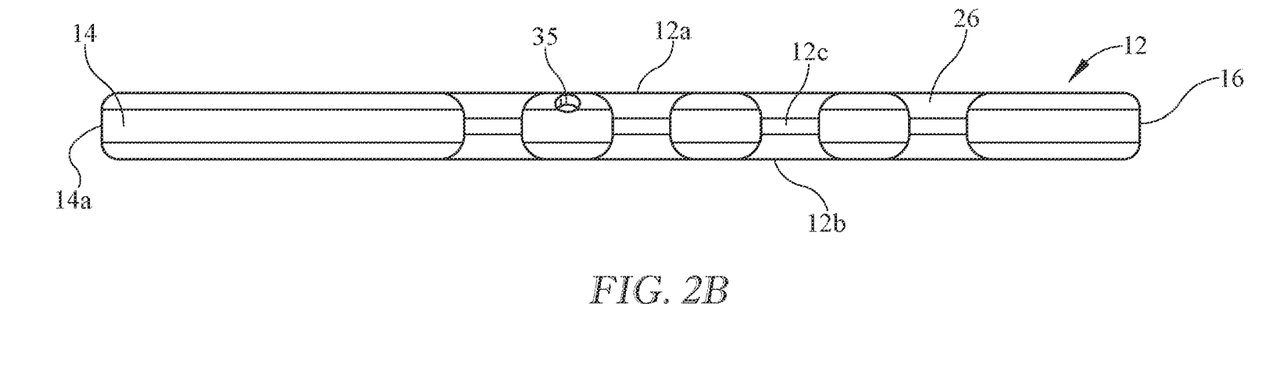
FIG. 2B is another side view of the retainer member of the rope coupling apparatus of FIG. 1, according to one embodiment.

FIGS. 2A and 2B are plane and side views of the retainer member 12. In some embodiments as shown here, the retainer member 12 may be an elongated and flat plate/bar in a generally rectangular configuration, with a length much greater than its width (e.g., in the embodiment shown, the length is about 4 times greater than its width). For example, the retainer member may be about 16 inches long and 4 inches wide. In some embodiments, the retainer member 12 may be of uniform thickness (e.g., about 1 inches thick), providing two parallel planar surfaces 12a and 12b and a transverse side surface 12c therebetween. It should be understood that the thickness may vary depending on many factors, including the material from which the retainer member 12 is made, the designed rope size, and its anticipated loading. In some embodiments, each corner and the edge 12d of the retainer member 12 may be rounded/curved for better appearances and/or avoiding sharp edges. In some embodiments, a first portion edge 14a of the first portion 14 of the retainer member 12 may be in a curved configuration to form a semicircular first portion for better coupling with other fittings or accessories. It should be understood that the retainer member 12 may be in different configurations such as trapezoid, square, oval, or any other suitable shapes/configurations, and that the dimensions of the retainer member 12 may also vary. In some embodiments in which both opposing sides 18 and 20 have the plurality of notches 26, the retainer member 12 combined with the plurality of notches 26 on the opposing sides 18 and 20 and/or side surfaces 12c are configured so that the rope may be wound into one of the plurality of notches 26, across or around the retainer surface 12a and/or 12b, and then through or into the other opposite notch 26. In some preferred embodiments, the plurality of notches 26 may be disposed helically or obliquely on both opposing sides 18 and 20 so as the rope may be wound diagonally around the retainer surface 12a and/or 12b for better fixation of the rope on the retainer member 12. In preferred embodiments, additional features (e.g., a cam for preventing back out, a post or as additional rope routing point, a dog with torsion spring, a gator ladder type design on the open side, etc.) may be provided to further secure the rope on the retainer member 12. For example, as shown in FIG. 2A, a post 36 may be disposed diagonally relative to the first surface 12a of the retainer member 12 and close to/proximate the first portion 14 of said retainer member 12 (e.g., on the approximate fourth turn of the rope). In some embodiments, the post opening 35 for the post 36 may be located on the rounded edge 12d of the retainer member 12. In the embodiment shown, the post 36 may have a length of at least about 2 times the rope diameter with about half of its length being inserted into the post opening 35. The portion of the post 36 around which the rope is routed may point outwards from the center of the retainer member 12 as shown in the right side view of FIG. 2A, forming an angle of, for example, about 135 (e.g., approximate 120 to approximate 180) degrees relative to the first surface 12*a* of the retainer member 12. It should be understood that the post 36 may also be located in different locations of the retainer member 12 in different manners and at different angles. For example, the post 36 may be located vertically in the middle of the retainer member 12.

As stated previously, the opening 22 on the first portion 14 of the retainer member 12 may be used to connect to a fitting or accessory, such as a weight-carrying carabiner, D-ring or other connection of a harness of a user, an anchoring rod/bar, a loop of rope, or other connection device, and the like. An opening edge 22*a* of the opening 22 may also be rounded or beveled similar to the notch edge 26*a* to avoid chafing the rope that threads therethrough in some embodiments. The size of the opening 22 may be configured large enough to accept a rope, carabiner, D-ring or other such load bearing clips or devices. In some embodiments as shown in FIG. 1, the opening 22 at the first portion 14 of the retainer member 12 may be in a pear-shaped configuration with the wider portion of the pear-shaped opening being proximate the first portion edge 14*a* and the narrower portion being proximate the center of the retainer member 12. The pear-shaped opening 22 may prevent the rope from disengaging accidently and help to maintain the load on the center of the apparatus 10. The pear-shaped opening may also prevent the apparatus 10 from turning or twisting when the apparatus 10 is used as a rope braking tool. It should be understood that the opening 22 may be of some other suitable configurations, such as circular or oblong, and the like. In some other embodiments, a second opening (not shown) may also be provided on the first and/or second portions 14 and 16 of the retainer member 12 in addition to the opening 22 on the first portion 14 as an additional resistance point to provide further security.

In different embodiments that include the rope receiver 24 of the retainer member 12, the rope receiver 24 may have different configurations. Each configuration typically allows a rope to access the retainer member 12 via a surface of the retainer member 12, as opposed to requiring the rope to go through an opening through the retainer member 12 (as, for example, the opening 22). For example, in some embodiments, the rope receiver 24 may be placed on the first surface 12*a* of the retainer member 12 and include one or more guides 28, one or more guide plates 30, and one or more fasteners 32 coupling the one or more guides 28 to the retainer member 12. In some embodiments, one or more second guides 34 may be provided on the second surface 12*b* of the retainer member 12. In some embodiments (e.g., only one second guide 34 is used on the second surface 12*b* when the user is working at some intermediate point of a long rope and does not want or need to have the security of a retained rope), the second guide 34 may have a larger diameter compared with the guide 28 on the first surface 12*a* to help to retain the rope. In such embodiments, the retainer member 12, the guide 28, the guide plate 30, and the second guide 34 may also have one or more retainer member fastener openings 31, guide fastener openings 27, guide plate fastener openings 29, and second guide fastener openings 33, respectively, for one or more corresponding fasteners 32 going through to couple the rope receiver 24 on the retainer member 12. Accordingly, the guide 28 and/or the second guide 34 may be adjustably disposed between the first surface 12*a* of the retainer member 12 and the one or more guide plates 30 and/or on the second surface 12*b* of the retainer member 12 respectively by inserting the one or more fasteners 32 through the guide plate 30, the guide 28, the retainer member 12, and the second guide 34 sequentially. In some embodiments, the guide 28 and/or the second guide 34 may rotate around the fastener 32 as a rolling axis. It should be understood that the guide 28 and/or the second guide 34 may or may not rotate, roll, spin, or move, as desired in some embodiments. As shown here, the fastener 32 may be a partially threaded tap bolt in some embodiments. It should be understood that the fastener 32 may be any other suitable configurations/mechanisms, such as, a nut combined with a screw/shaft, geometric coupling (e.g., pin and slots, etc.), and fasteners of many types (e.g., screws, rivets, pins, ball detents, etc.). It should be understood that various fastening features (e.g., screws, snaps or spring clips, pin and slots, swaged/flared pins, bendable tabs, etc.) may be provided to permit the rope receiver 24 to be secured to the retainer member 12 firmly without risk of loosening or displacement, while further easing the installation/removal process.

Figure 3:
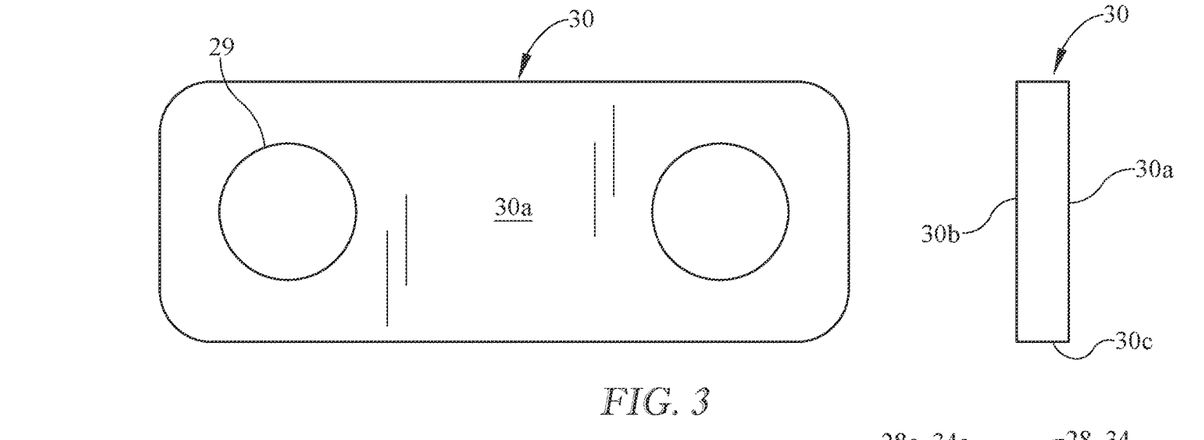
FIG. 3 is a combination of a plan view and a side view of a guide plate of a rope receiver of the rope coupling apparatus of FIG. 1, according to one embodiment.
Figure 4:
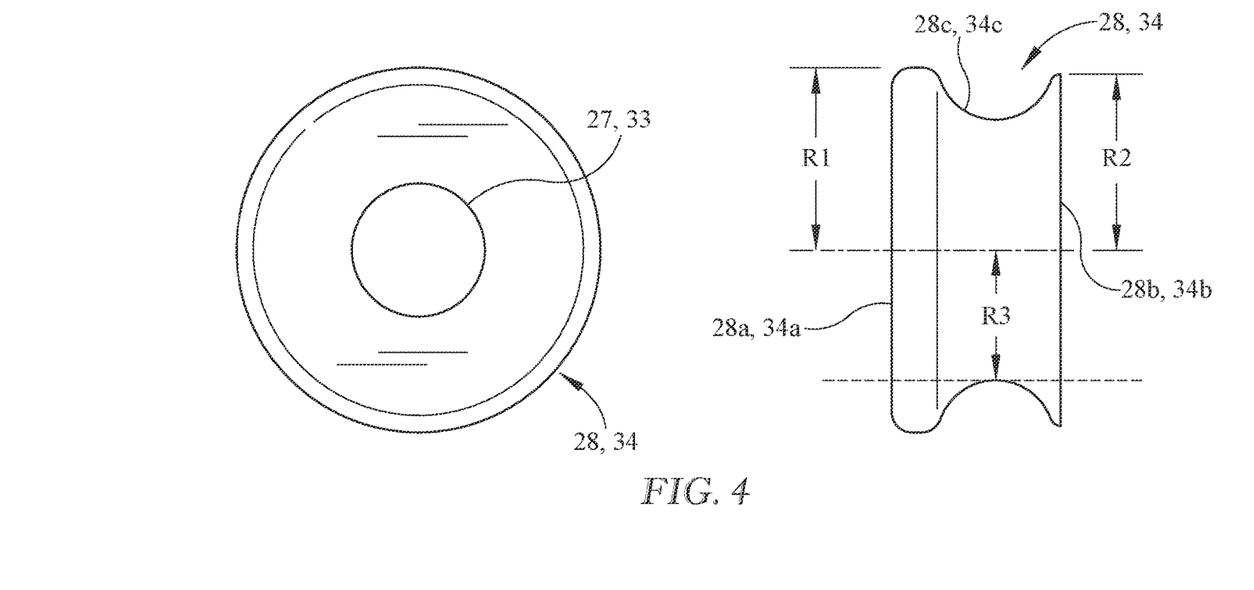
FIG. 4 is a combination of a plan view and a side view of a guide of a rope receiver of the rope coupling apparatus of FIG. 1, according to one embodiment.

In some embodiments as shown in FIGS. 3 and 4, the guide plate 30 may be in a rectangular plate configuration having a first surface 30*a* adjacent the fastener 32, a parallel second surface 30*b* adjacent the guide 28, a third surface 30*c* transverse to the first surface 30*a* and the second surface 30*b*, and one or more (e.g., two) guide plate fastener openings 29. In some embodiments, the guide 28 and the guide plate 30 may be manufactured as a single element. In some embodiments as shown in FIGS. 1 and 2A, the two guides 28 and corresponding retainer member fastener openings 31 may be disposed helically and proximate the opposing side portions 18 and 20 of the retainer member 12. As shown in FIGS. 1 and 4, in some embodiments, the guide 28 may have a first guide surface 28*a* adjacent the guide plate second surface 30*b*, a second guide surface 28*b* adjacent the retainer member surface 12, and a third guide surface 28*c* adjacent the rope threaded through, and the guide 34 may have a first guide surface 34*a* facing outwards from the second surface 12*b* of the retainer member 12, a second guide surface 34*b* adjacent the second surface 12*b* of the retainer member 12, and a third guide surface 34*c* adjacent the rope threaded through. In some embodiments, the first guide surfaces 28*a*, 34*a* and the second guide surfaces 28*b*, 34*b* are in circular configurations with a radius R1 and R2, respectively. It should be understood that the radii may be of many shapes and sizes and, for example, may be selected to support the rope under different loads and align the rope load with the centerline of the apparatus 10. In some embodiments, the R1 may be greater than R2. For example, the R1 may be 0.875 inches and the R2 may be 0.845 inches. In some embodiments, the third guide surface 28*c*, 34*c* may be curved to form a smooth guide surface between the first guide surfaces 28*a*, 34*a* and the second guide surfaces 28*b*, 34*b* to enlarge the contacting surface for better guiding and retaining the rope therethrough. It should be understood that the third guide surface 28*c*, 34*c* may be any suitable configured smooth surface against which the rope move. In such embodiments, a third radius R3 may be defined as a distance between the center of the first guide surface 28*a*, 34*a* and the second guide surface 28*b*, 34*b*, and the closest point of the curved third surface 28*c*, 34*c* as indicated in FIG. 4B. In some embodiments, the R3 may be less than both R1 and R2, for example, R3 may be 0.625 inches. It should be understood that the configuration of the rope receiver 24 here is only an example and not limiting. For example, the rope receiver 24 may also be in an opening configuration (e.g., a second opening), which is similar to the opening 22 on the opposite portion of the retainer member 12.

Figure 5:
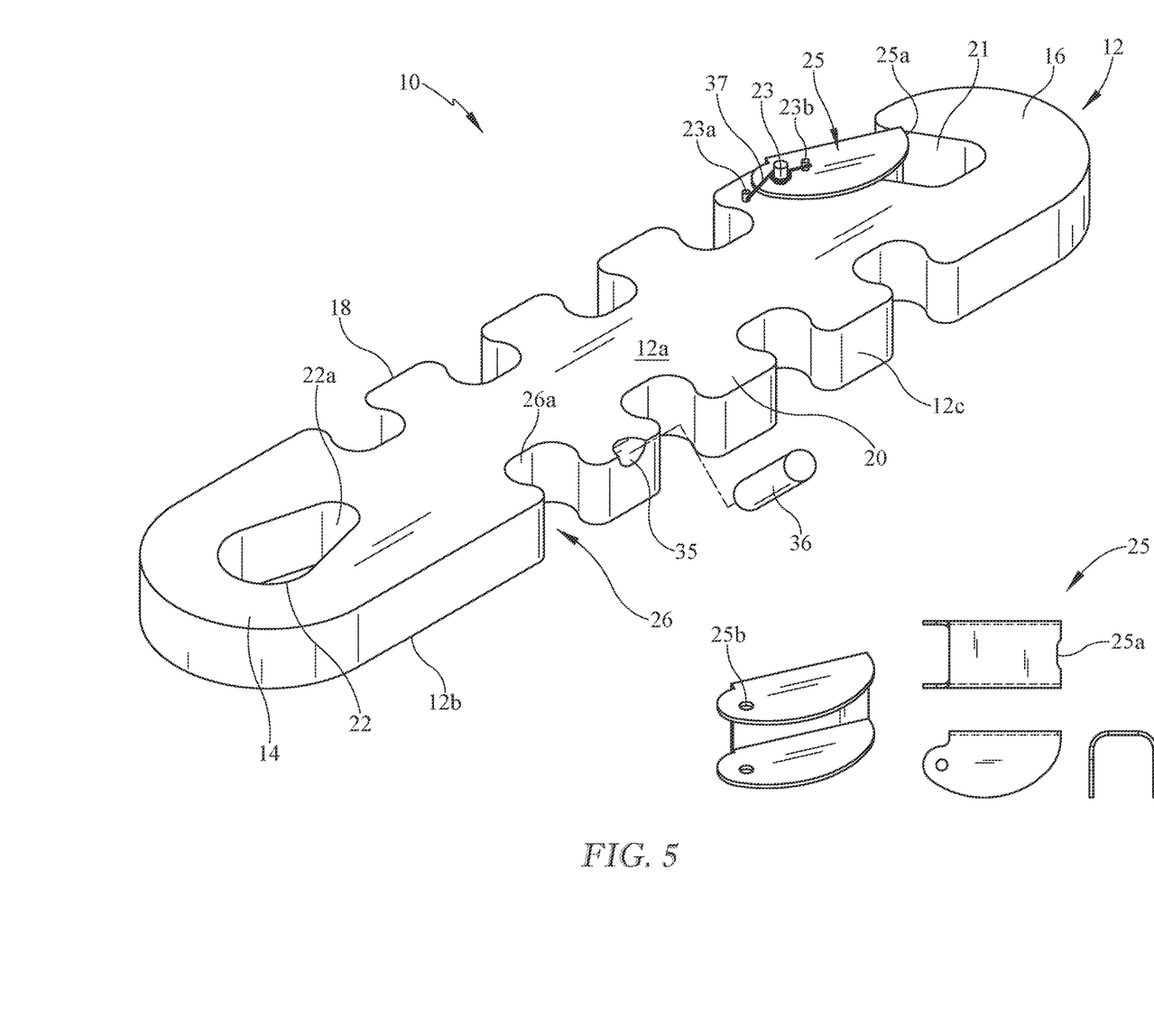
FIG. 5 is a combination of a perspective view of a rope coupling apparatus with a latch and several detailed views of the latch, according to one embodiment.

As mentioned previously, in different embodiments that include the rope receiver 24 of the retainer member 12, the rope receiver 24 may have different configurations. For example, in some embodiments as shown in FIG. 5, the rope receiver may include a notch 21 and a latch or latch arm 25 pivoted upon a pin 23 through a pin opening 25b, which extends transversely proximate the notch 21 on the second portion 16 of the retainer member 12 of the rope coupling apparatus 10. In some embodiments, a torsion spring 37 coiling/encircling the pin 23 may constantly bias, force, or urge the latch 25 in a closing direction (e.g., a clockwise direction as shown in FIG. 5) across the notch 21 into abutment with the inner surface of the notch 21, so that the latch 25 may be switchable/rotatable/swingable between an open position and a closed position. When the latch 25 is in the open position, any portion of a rope (that is, an end of the rope or any portion along the length) may be threaded within the notch 21, and the latch 25 may be configured to prevent the rope from accidentally escaping free from the notch 21 in the closed position. In some embodiments, a second pin 23a on the first surface 12a of the retainer member 12, and/or a third pin 23b on the latch 25 may also be provided to be against the torsion spring 37 for better actuating of the latch 25. In such embodiments, the tensional level applied to the rope by the latch 25 may be adjusted by adjusting the torsion spring 37 and/or the associations with the one or more pivot pins 23, 23a, and 23b. However, it should be understood that any other suitable mechanisms (e.g., pin and slot, etc.) instead of the torsion spring 37 as shown here may be applied for the actuating mechanism of the latch 25 to retain the rope within the notch 21 with or without a bias force. The details of construction of the latch 25 may vary to some extent without changing the present invention. In some embodiments, the latch may be configured with contours to fit closer to the contours of the retainer member 12 and/or the rope. For example, in some embodiments, a latch notch 25a may be provided at the end of the latch 25 facing the inner surface of the notch 21 to better fit the retainer member 12 and/or the rope when the latch 25 is in the closed position.

In some embodiments, the apparatus 10 may be constructed of a light and strong material, such as aluminum or aluminum alloys, but could also be constructed of titanium or titanium alloys or other strong, durable metal. For example, the apparatus 10 may be machined from 6061-T6 or better grade aluminum. Other metal materials, such as stainless steel alloys, may also be used, but would obviously be heavier. In some other embodiments, the apparatus 10 may be non-metallic, as by being constructed of a strong, sturdy, and, durable plastic, such as high density polyurethane, or a composite material such as carbon fiber/epoxy or similar materials. When the apparatus 10 is constructed of a non-metallic material, its dimensions may be adjusted accordingly in order to support loads in accordance with its anticipated use. In some embodiments, metal may be preferred as the temperature during the fabrication process may be too high for other materials. In summary, the apparatus 10 may be formed from various materials and applied with various coatings, which may compliment the anticorrosion requirements and the overall appearances. For example, in some embodiments, all or a portion of the apparatus 10 may include a coating to increase frictional grip.

Figure 6:
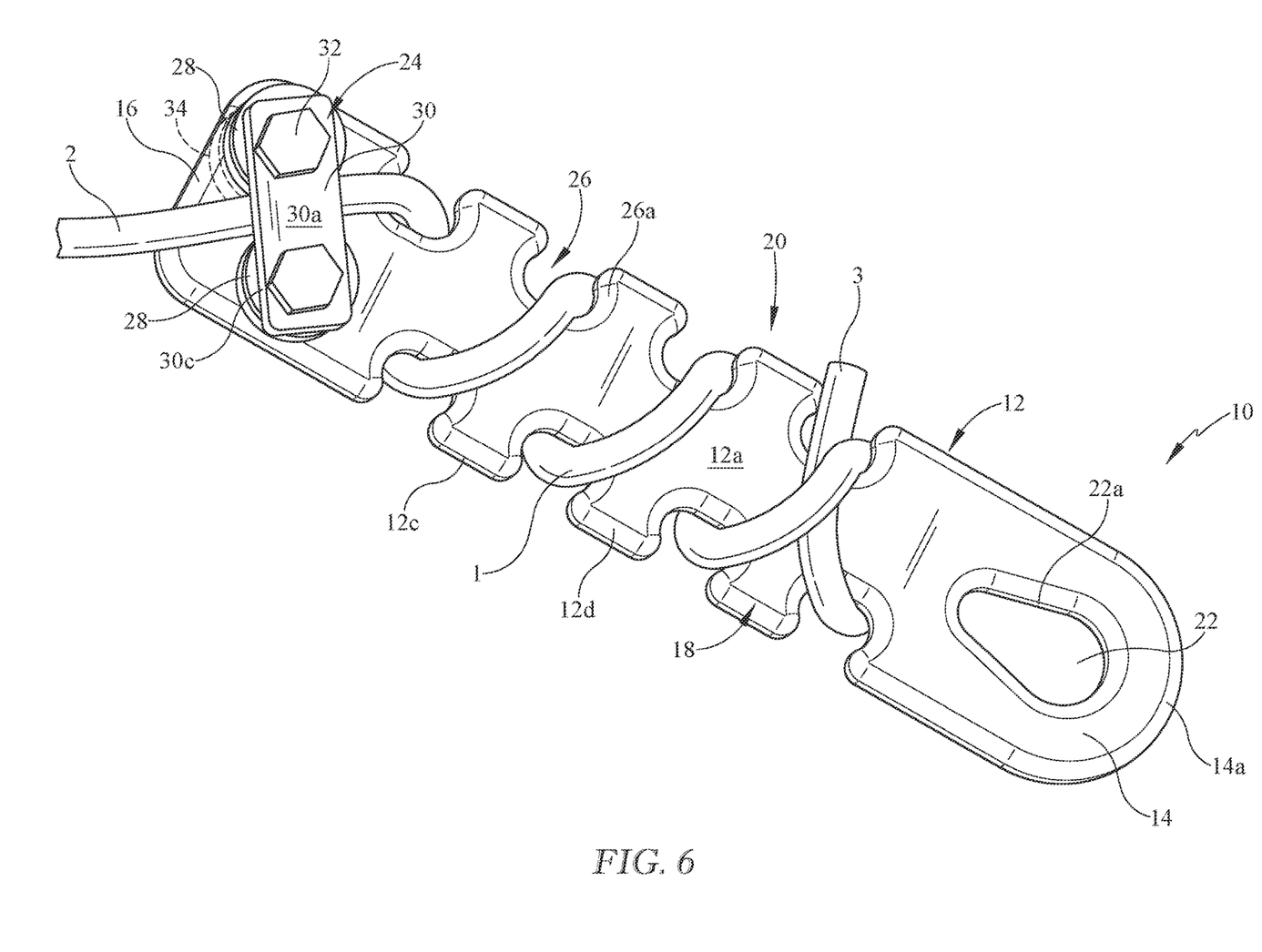
FIG. 6 is a perspective top view of the rope coupling apparatus of FIG. 1 with a rope end threaded therethrough, according to one embodiment.

As can be seen in FIG. 6, the rope coupling apparatus 10 is illustrated as being applied with a rope 1 having a secured standing end 2 and a free working end 3. In order to secure the rope 1 to the apparatus 10, the working end 3 of the rope 1 is threaded, as illustrated, through the rope receiver 24 and the consecutive notches 26. When the working end 3 of the rope 1 has passed through the last of these notches 26 proximate the first portion 14 of the retainer member 12, the working end 3 of the rope 1, for example, may then be threaded back on itself under one loop/wrap (e.g., the last one) of the threaded rope 1 and tightened around the retainer member 12, so that the rope 1 is then locked in place on the apparatus 10. The friction that the rope 1 develops by threading through the rope receiver 24 and the consecutive notches 26 provides the frictional grip required to secure the rope 1 in place on the apparatus 10. Friction between the rope 1 and the rope receiver 24 and the consecutive notches 26 may prevent the rope 1 from pulling out of and/or rewinding from the apparatus 10.

Figure 7:
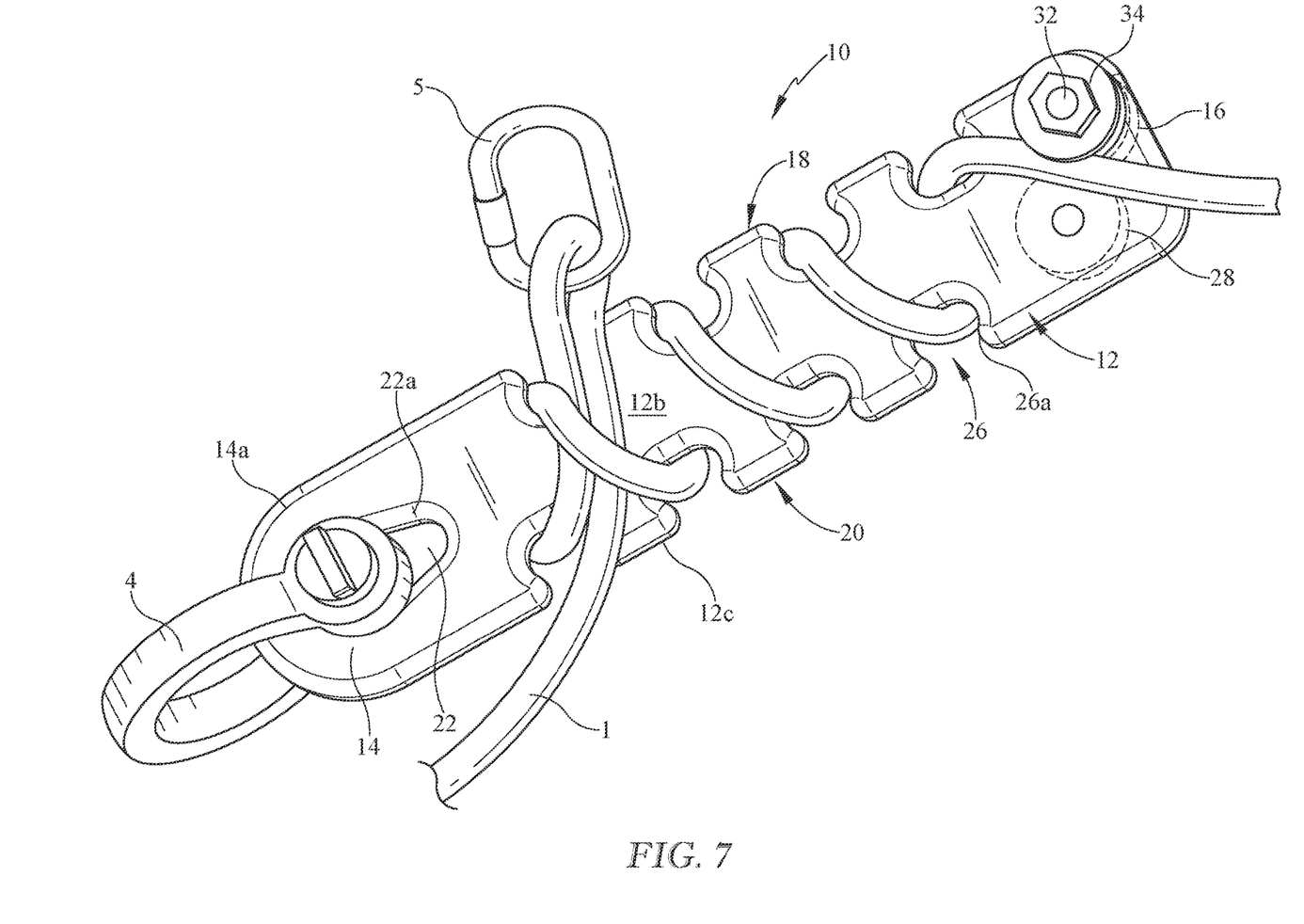
FIG. 7 is a perspective bottom view of the rope coupling apparatus of FIG. 1 when used in the middle of a rope, according to one embodiment.

In some embodiments, the rope coupling apparatus 10 may also be used in the middle of a rope or at any intermediate point. In such embodiments as shown in FIG. 7, the rope coupling apparatus 10 may be applied directly along any portion of the rope 1, with the one or more second guides 34 on the second surface 12b of the retainer member 12 adjoining the rope 1 to provide friction as desired. In some embodiments, a shackle 4 may be provided at the opening 22 of the first portion 14 of the retainer member 12 for connecting the rope coupling apparatus 10 to another item, such as an anchor point. In such embodiments, the thickness of the retainer member 12 may be configured to only allow shackles with minimum sizes equal to or greater than the capacity of the retainer member 12. In some further embodiments, a carabiner 5 may also be provided at the last loop/wrap of the rope 1 to provide a connection point and further prevent the rope 1 from slipping from the retainer member 12 when the rope 1 is tightened therearound.

Figure 8:
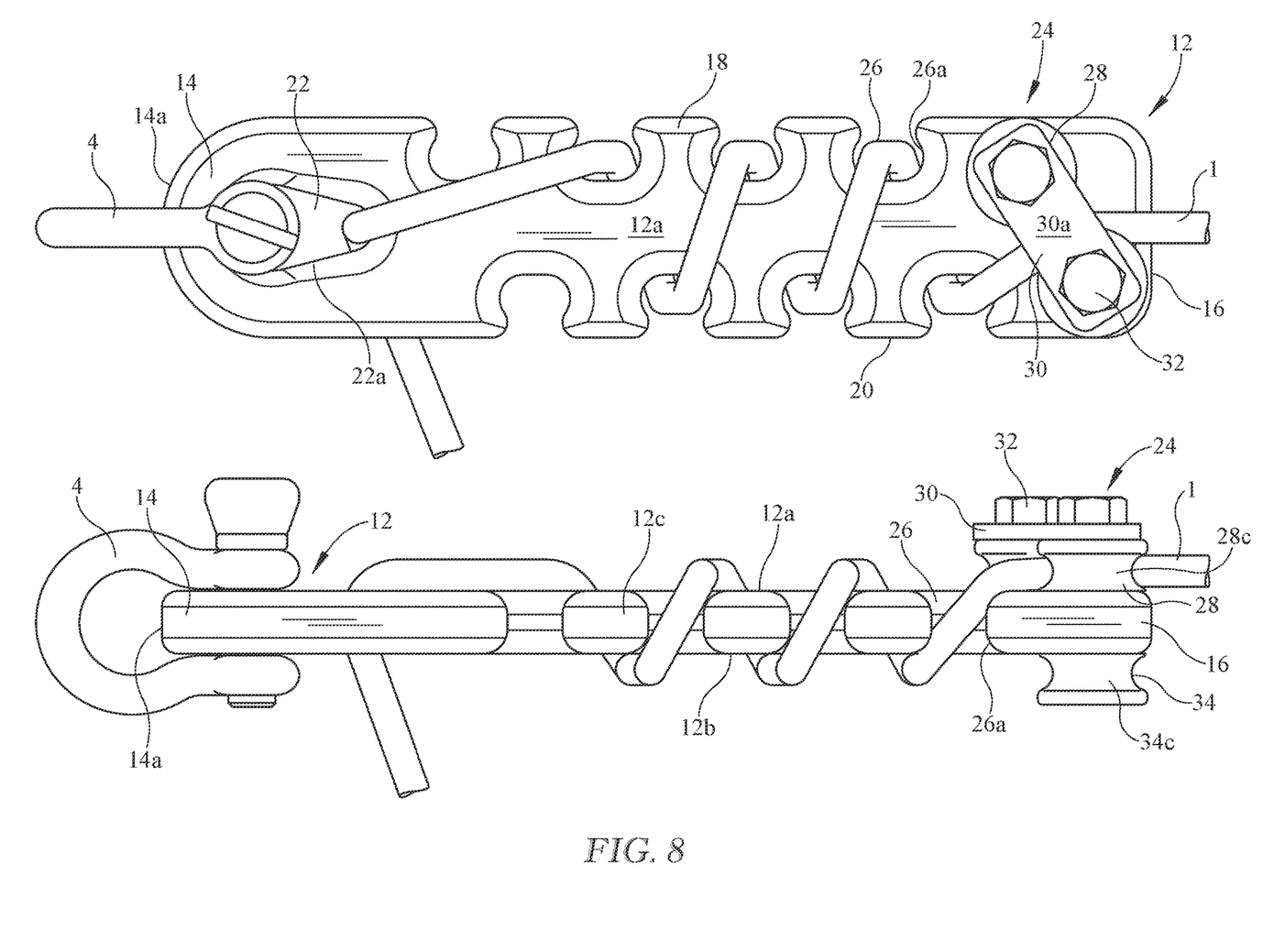
FIG. 8 is a combination of a plan view and a side view of the rope coupling apparatus of FIG. 1 when used as a rope braking tool, according to one embodiment.

In some embodiments, the rope coupling apparatus 10 may also be used as a rope braking tool. In such embodiments as shown in FIG. 8, upon a force applied on the rope 1, such as a pulling force from the direction of the end of rope 1 being secured, the force may cause the rope 1 in the plurality of notches 26 and/or the opening 22 to bear against the edges 22a and/or 26a to depress the rope 1, thus rigidly retaining the position of the rope 1 as applied. Accordingly, the rope 1 is thoroughly wedged in position to securely hold against accidental slipping out, then the user may use the rope coupling apparatus 10 as a rope braking tool. With intention, the rope 1 may be easily detached from around the retainer member 12 when desired. It should be understood that the rope coupling apparatus 10 may be an adjustable rope braking tool that may be positioned anywhere along a length of a rope and to accommodate different size ropes. It should be further understood that not all notches 26 may be needed to be threaded through to provide desired brake drag when the rope coupling apparatus 10 is used as a rope braking tool. If desired, a diagram (not shown) may be engraved or otherwise placed on the retainer member surface 12a and/or 12b to show a user the precise manner of threading the rope 1 through the apparatus 10 and securing it thereon.

Figure 9:
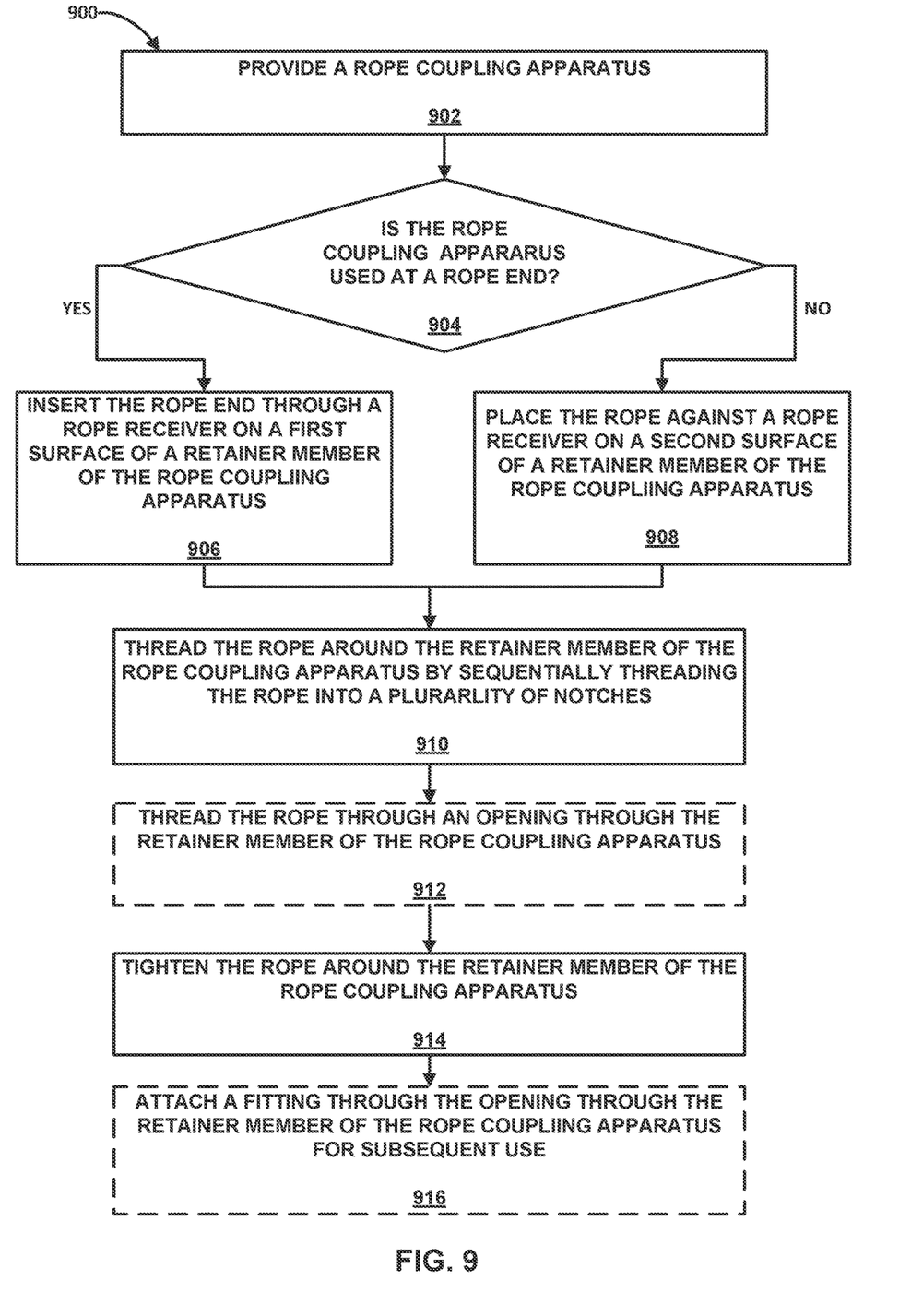
FIG. 9 is a flowchart illustrating an example sequence of using the rope coupling apparatus of FIG. 1, according to one embodiment.

FIG. 9 illustrates a flowchart of an example sequence 900 of operations for using the disclosed rope coupling apparatus 10 as shown in FIG. 1 with the rope 1. Sequence 900 begins in block 902 by providing the rope coupling apparatus 10 as shown in FIG. 1 having the retainer member 12, the opening 22, the rope receiver 24 with one or more guides 28 and 34 on the first and second surface 12a and 12b, respectively, and the plurality of notches 26. Next, a determination may be made in block 904 regarding whether the rope coupling apparatus 10 would be used at the end of the rope 1. If the rope coupling apparatus 10 is used at the end of the rope 1, in block 906, the user may position the rope 1 on the first surface 12a of the retainer member 12 of the rope coupling apparatus 10 and insert one end (e.g., the working end 3) of the rope 1 through the rope receiver 24, for example, between the pair of the guides 28 on the first surface 12a of the second portion 16 of the retainer member 12 of the rope coupling apparatus 10 as shown in FIG. 6. If the rope coupling apparatus 10 is not used at the end of the rope 1, for example, used in the middle of the rope 1, the user may position the rope 1 on the second surface 12b of the retainer member 12 of the rope coupling apparatus 10 and place the rope 1 against the rope receiver 24, for example, place the rope 1 against the single second guide 34 on the second surface 12b of the second portion 16 of the retainer member 12 of the rope coupling apparatus 10 as shown in FIG. 7.

Then, in block 910, the user may thread/wind/route the rope 1 around the retainer member 12 of the rope coupling apparatus 10 by sequentially threading the rope working end 3 into the plurality of notches 26 disposed on one or both of the opposing side portions 18 and 20. After all the desired notches 26 are threaded through by the rope 1, the user may thread the rope working end 3 under one loop/wrap (e.g., the last one) of the threaded rope 1 and then tighten the threaded rope 1 around the retainer member 12 in block 914, therefore providing a safe and secure rope end attachment for subsequent use. It should be understood that operations indicated by the block 906 or 908 and the block 910 may be reversed in some embodiments. For example, the user may thread the rope 1 around the retainer member 12 first before inserting the rope 1 to the rope receiver 24. In some embodiments, after all the desired notches 26 are threaded through by the rope 1, the sequence 900 may further include threading the working end 3 of the rope 1 through the opening 22 on the first portion 14 of the retainer member 12 (see dashed block 912) if desired by the user, as an additional resistance point for the rope working end 3 (e.g., when the apparatus 10 is used a rope braking tool as shown in FIG. 8). In some embodiments, the sequence 900 may further include attaching a fitting (e.g., a hitch, shackle, e.g.) through the opening 22 on the first portion 14 of the retainer member 12 for subsequent purposes in a dashed block 916 if desired by the user (e.g., as shown in FIGS. 7 and 8). It should be understood that the fitting may also be attached to the wrap/loop of the rope 1 as shown in FIG. 7 in some embodiments if desired by the user.

Figure 10:
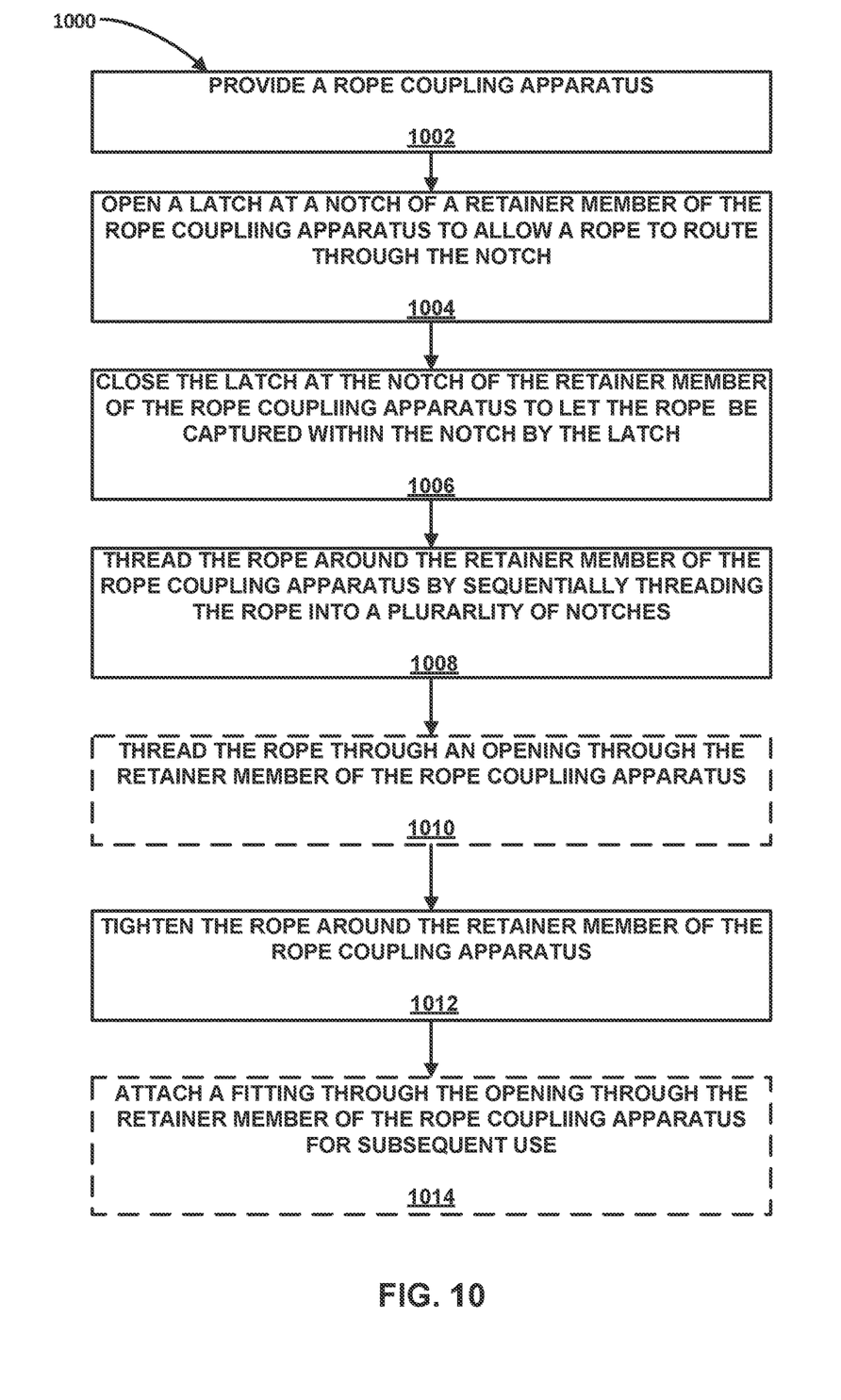
FIG. 10 is a flowchart illustrating an example sequence of using the rope coupling apparatus of FIG. 5, according to one embodiment.

FIG. 10 illustrates a flowchart of an example sequence 1000 of operations for using the disclosed rope coupling apparatus 10 as shown in FIG. 5 with the rope 1. Sequence 1000 begins in block 1002 by providing the rope coupling apparatus 10 as shown in FIG. 5 having the retainer member 12, the opening 22, the latch 25 at the notch 21, and the plurality of notches 26. Next, the user may open the latch 25 at the notch 21 to allow any portion of the rope 1 (e.g., the ends or any intermediate portion of the rope 1) through the notch 21 in block 1004 and then close the latch 25 to let the rope 1 be captured within the notch 21 by the latch 25 in block 1006. Then, in block 1008, the user may thread/wind/route the rope 1 around the retainer member 12 of the rope coupling apparatus 10 by sequentially threading the rope working end 3 into the plurality of notches 26 disposed on one or both of the opposing side portions 18 and 20. After all the desired notches 26 are threaded through by the rope 1, the user may thread the rope working end 3 under one loop/wrap (e.g., the last one) of the threaded rope 1 and then tighten the threaded rope 1 around the retainer member 12 in block 1012, therefore providing a safe and secure rope end attachment for subsequent use. It should be understood that rope receiver operations (e.g., the operations of the latch 25) indicated by the blocks 1004 and 1006, and the rope routing indicated by the block 910 may be reversed in some embodiments. For example, the user may thread the rope 1 around the retainer member 12 first before opening/closing the latch 25 and routing the rope 1 through the notch 21. In some embodiments, after all the desired notches 26 are threaded through by the rope 1, the sequence 1000 may further include threading the working end 3 of the rope 1 through the opening 22 on the first portion 14 of the retainer member 12 in a dashed block 1010 if desired by the user, as an additional resistance point for the rope working end 3 (e.g., when the apparatus 10 is used a rope braking tool as shown in FIG. 8). In some embodiments, the sequence 1000 may further include attaching a fitting (e.g., a hitch, shackle, e.g.) through the opening 22 on the first portion 14 of the retainer member 12 for subsequent purposes in a dashed block 1014 if desired by the user (e.g., as shown in FIGS. 7 and 8). It should be understood that the fitting may also be attached to the wrap/loop of the rope 1 as shown in FIG. 7 in some embodiments if desired by the user.

Thus, the attachment of the rope 1 to the apparatus 10 is easy to achieve, requiring merely the threading of the rope 1 through the rope receiver 24, and adjacent notches 26 (and the opening 22 if desire by the user). It should be understood that the example sequence 900 is not limiting here, and the apparatus 10 may be used in a number of different ways. For example, in some embodiments, the apparatus 10 may be used in the middle of a rope instead of at the end of the rope. In some other embodiments, the standing end 2 of the rope 1 may be unsecured, and the apparatus 10 may be used as a rope braking tool by gradually releasing the rope 1 to slid therethrough.

In summary, the rope coupling apparatus 10 provides a simple and efficient system that permits an user to attach a rope to a specific connection without the need of any tools. The rope coupling apparatus 10 may be positioned anywhere along a length of any suitable ropes including conventional 3-strand laid rope, solid braid, hollow braid, double braid, core dependent, or static kernmantle lifeline. The termination may provide a majority of the breaking strength of the rope. In general, it should be understood that some features described above do not constitute limitations of the present disclosure, but rather have only been described for the sake of completeness. Instead, the present disclosure is particularly directed to a rope coupling apparatus 10 configured to provide sturdy connections instead of rope knots. It should also be understood that the rope coupling apparatus 10 may be a variety of constructions, shapes, sizes, quantities, and positions but still accomplish the same intent. The elements depicted in the figures may not be drawn to scale and thus, the elements may have different sizes and/or configurations other than as shown in the figures.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

What is claimed is:

1. A rope coupling apparatus, comprising:
   a retainer member having a first, distal portion, a second, proximal portion, opposing side portions between said first portion and said second portion, and a first surface connected to the opposing side portions;
   an opening through said first portion of said retainer member;
   a rope receiver on said second portion of said retainer member, the rope receiver comprising one or more guides coupled to said retainer member, one or more guide plates coupled to said one or more guides, and one or more fasteners coupling said one or more guides and said one or more guide plates to said retainer member, wherein the one or more guides are placed between the one or more guide plates and the first surface of the retainer member; and
   a plurality of notches disposed on one or both of said opposing side portions.

2. The rope coupling apparatus of claim 1, wherein said retainer member is a planar elongated plate having a first surface, a second surface parallel to the first surface, and a third surface transverse to said first surface and said second surface.

3. The rope coupling apparatus of claim 2, wherein said one or more guides are disposed between said first surface of said retainer member and said one or more guide plates via said one or more fasteners.

4. The rope coupling apparatus of claim 3, wherein said one or more guides comprise two guides disposed proximate said opposing side portions on said first surface of said retainer member.

5. The rope coupling apparatus of claim 4, wherein said rope receiver further comprises one or more second guides disposed on said second surface of said retainer member.

6. The rope coupling apparatus of claim 5, wherein the diameter of said second guide is larger than that of said guide disposed on said first surface of said retainer member.

7. The rope coupling apparatus of claim 1, wherein said plurality of notches are disposed helically on both said opposing side portions.

8. The rope coupling apparatus of claim 1, further comprising a post disposed on either of said opposing side portions of said retainer member.

9. The rope coupling apparatus of claim 8, wherein said post is disposed diagonally relative to said first surface of said retainer member.

10. The rope coupling apparatus of claim 9, wherein said post is disposed proximate the first portion of said retainer member.

11. The rope coupling apparatus of claim 1, wherein said opening through said first portion of said retainer member is pear-shaped.

12. The rope coupling apparatus of claim 1, wherein said retainer member is made of aluminum.

13. The rope coupling apparatus of claim 1, wherein said retainer member is accompanied with a coating to increase frictional grip.

14. The rope coupling apparatus of claim 1, wherein an edge of said first portion of said retainer member is in a curved configuration to form a semicircular first portion.

15. The rope coupling apparatus of claim 1, wherein said rope receiver on said second portion of said retainer member comprises a second opening through said second portion of said retainer member.

16. The rope coupling apparatus of claim 1, wherein said rope receiver on said second portion of said retainer member comprises a rotatable latch proximate a notch.

17. The rope coupling apparatus of claim 16, wherein said rotatable latch proximate said notch is movable between an open position and a closed position by a spring about a pivot pin.

18. A rope coupling apparatus, comprising:
a retainer member with a pair of opposing side portions, a first surface connected to each of the pair of opposing side portions, and a retainer member fastener opening through the first surface;
an opening through said retainer member;
a plurality of notches disposed on edges of said retainer member; and
a rope receiver coupled on said retainer member, wherein said rope receiver comprises a guide with a guide fastener opening and a fastener, wherein said guide is coupled to said retainer member by inserting said fastener through said guide fastener opening and said retainer member fastener opening.

19. The rope coupling apparatus of claim 18, wherein said rope receiver further comprises a guide plate with a guide plate fastener opening coupled to said guide, and said guide is disposed between said retainer member and said guide plate by inserting said fastener through said guide plate fastener opening, said guide fastener opening, and said retainer member fastener opening.

20. A method of connecting and/or terminating a rope, comprising:
(a) providing a rope coupling apparatus having a retainer member with a pair of opposing side portions, a first surface connected to each of the pair of opposing side portions, and a retainer member fastener opening through the first surface, an opening through said retainer member at a first end, a rope receiver at an end opposite said opening, and a plurality of notches;
(b) inserting said rope through said rope receiver;
(c) threading said rope around said retainer member of said rope coupling apparatus by sequentially threading said rope into said plurality of notches; and
(d) tightening said rope around said retainer member of said rope coupling apparatus.

21. The method of claim 20, further comprising threading said rope through said opening through said retainer member before the step (d).

22. The method of claim 20, further comprising a step (e) of attaching a fitting through said opening through said retainer member after the step (d).

23. The method of claim 20, wherein the order of the step (b) and the step (c) is reversed.

24. The method of claim 20, wherein said rope receiver of said rope coupling apparatus comprises a rotatable latch movable between an open position and a closed position, the step (b) of inserting said rope through said rope receiver thus comprises opening said latch and closing said latch.

\* \* \* \* \*